United States Patent [19]

Lewis

[11] 4,271,561
[45] Jun. 9, 1981

[54] POULTRY DISMEMBERING APPARATUS

[76] Inventor: Eugene J. Lewis, Rt. #1, Box 306, Demorest, Ga. 30535

[21] Appl. No.: 74,573

[22] Filed: Sep. 11, 1979

[51] Int. Cl.³ .............................................. A22C 21/00
[52] U.S. Cl. ..................................................... 17/11
[58] Field of Search ........................... 17/11, 12, 45, 52

[56] References Cited

U.S. PATENT DOCUMENTS

| | | | |
|---|---|---|---|
| 3,490,092 | 1/1970 | Harrison | 17/11 |
| 3,943,600 | 3/1976 | Cramer | 17/11 |

*Primary Examiner*—Willie G. Abercrombie
*Attorney, Agent, or Firm*—Beveridge, DeGrandi, Kline & Lunsford

[57] ABSTRACT

Apparatus for disjointing and removing the leg and thigh portions from the backs of poultry leg and back carcasses pendulously supported by the feet from shackles suspended from an overhead conveyor at spaced intervals with the back of each carcass lying between the legs in a reversed direction from the normal position. The apparatus comprises an endless dismembering conveyor mounted below the level of the shackles and having conveying elements engageable with one side of the carcass backs moving along a path that diverges both horizontally and vertically at an acute angle from the path of the overhead conveyor. Retaining bars are mounted closely above the dismembering conveyor conveying elements to extend axially along the conveyor in a spaced relationship as will contact the poultry carcasses immediately adjacent the juncture of the leg thighs and the backs and retain the backs between the retaining bars and the dismembering conveyor conveying elements. The thigh portions immediately adjacent the backs will follow the horizontal path of motion of the dismembering conveyor with the backs trapped between the retaining bars and dismembering conveyor and carried along the path of the dismembering conveyor as the legs are carried by the shackles along a diverging path suspended below the overhead conveyor, thereby parting the legs and thighs from the backs retained between the dismembering conveyor and overlying retaining bars.

8 Claims, 5 Drawing Figures

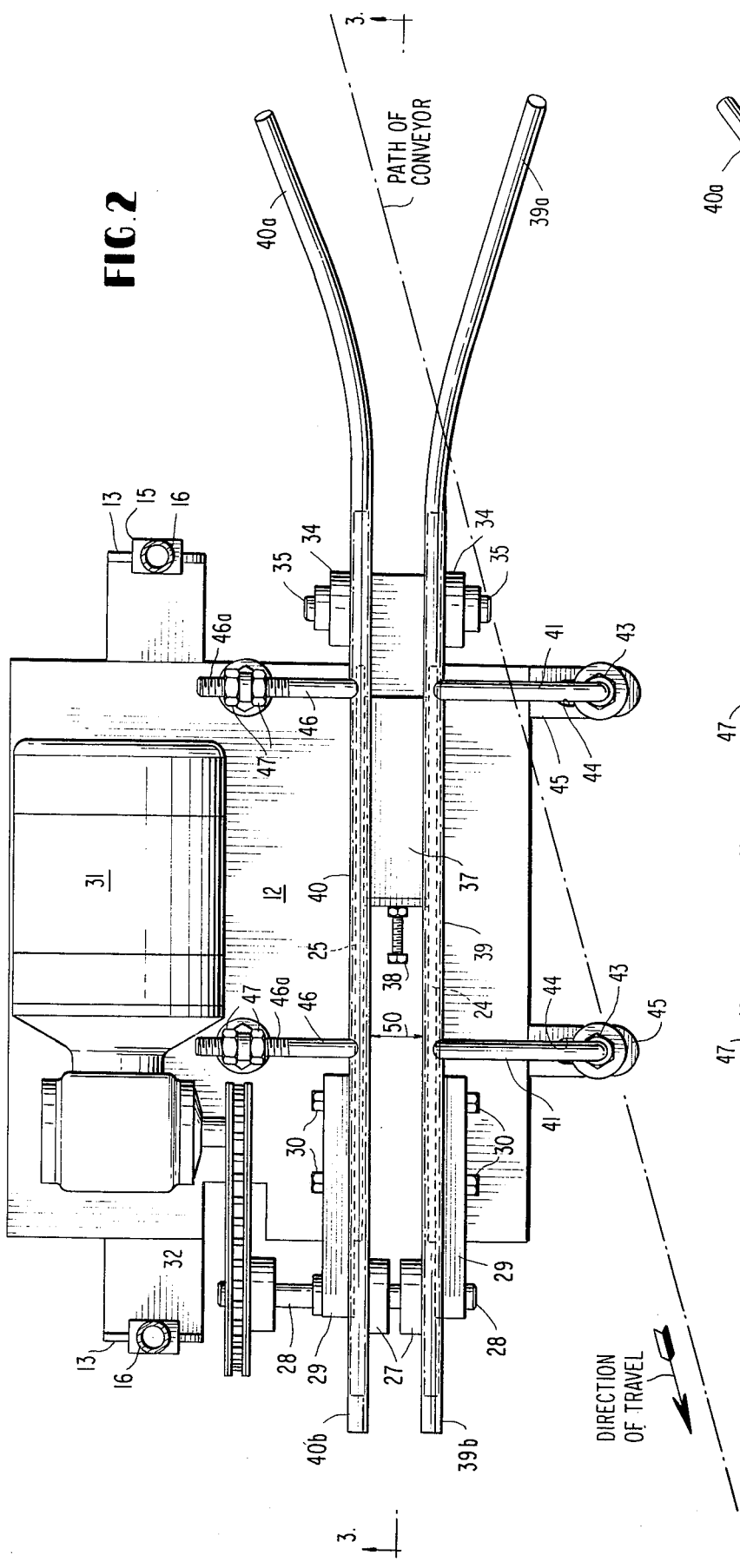
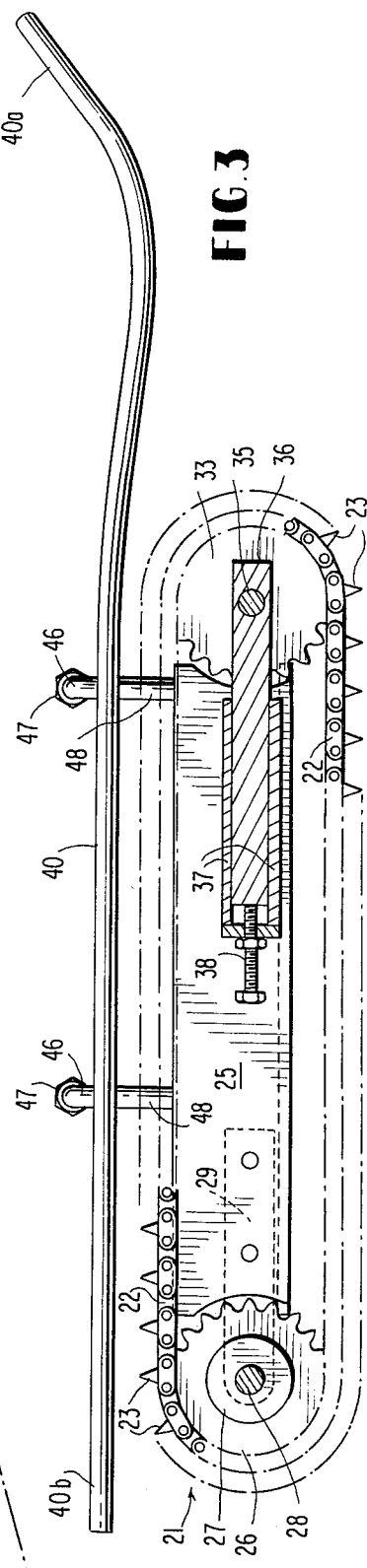

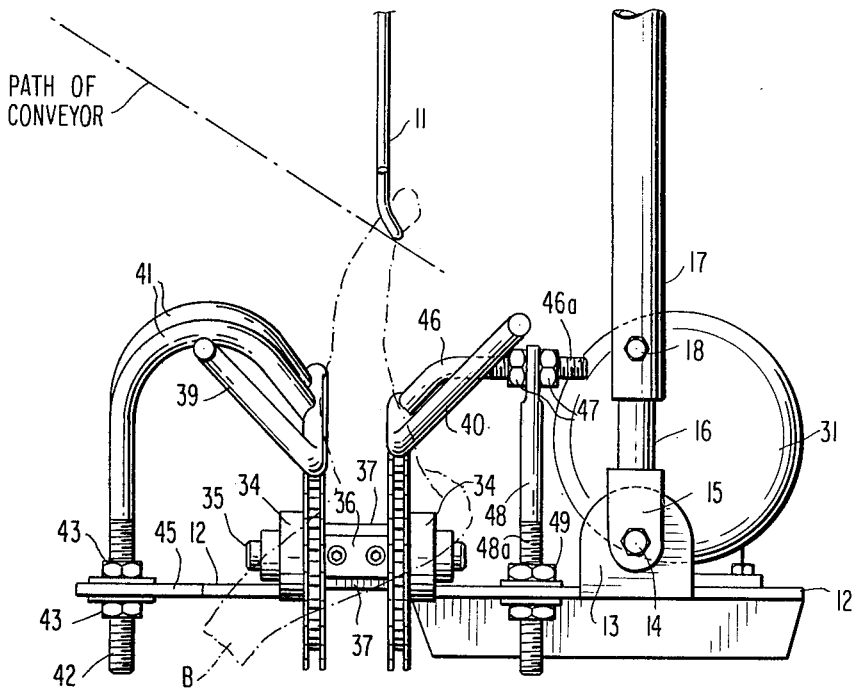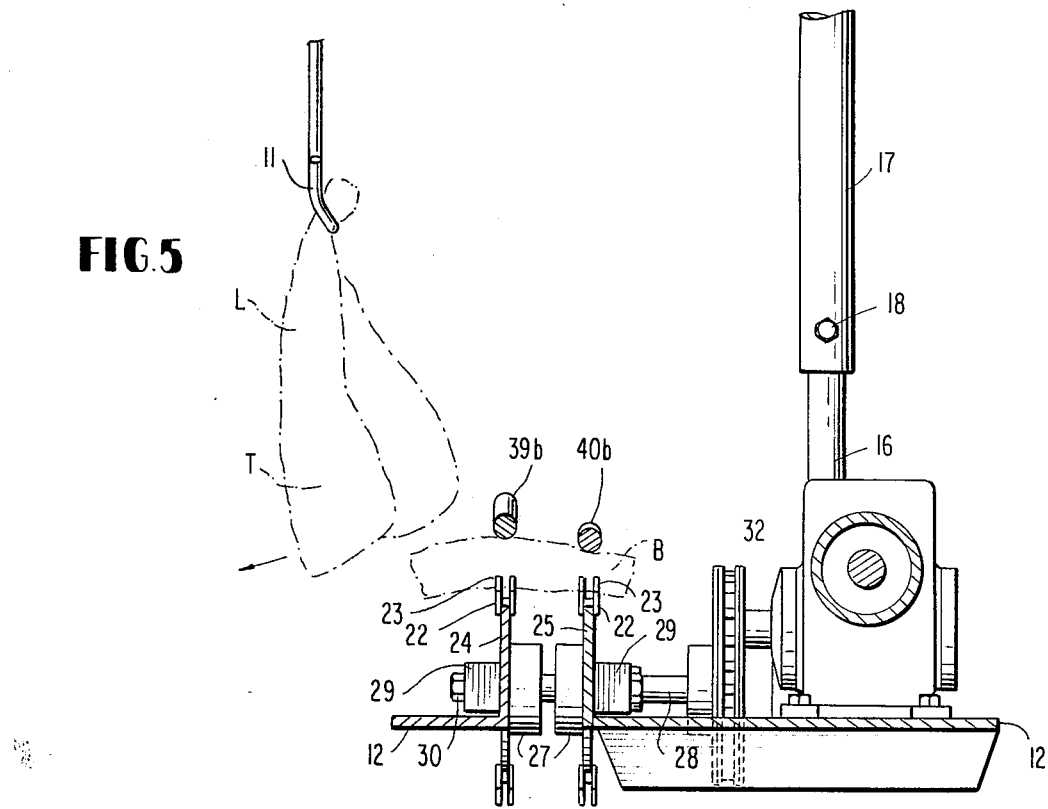

POULTRY DISMEMBERING APPARATUS

BACKGROUND

The present invention relates in general to apparatus used in connection with the commercial processing of poultry and particularly to apparatus utilized for dismembering the poultry into the component parts which then may be packaged separately for the market. In particular the present invention relates to apparatus by means of which the legs and thighs of poultry can be separated from the back. In the course of processing the poultry after it has been defeathered, cleaned and the head removed, the neck, wings, and breast may be removed leaving a carcass comprising the legs and thighs attached to the back.

It has previously been the most general practice to separate the legs and thighs from the back of a carcass by hand operation, although thigh pulling equipment of the nature illustrated in U.S. Pat. No. 3,943,600 has also been utilized. In order to part the leg and thigh from the back in a manner to strip substantially all of the thigh meat from the back, a pulling and twisting motion is utilized which can be accomplished by a human operator in grasping the end of the leg and pulling the leg and thigh away from the back with a simultaneous pulling and twisting motion. Whereas human operators can be trained to be quite efficient in this operation, it is desirable to reduce costs by mechanizing the entire poultry dismembering process as much as possible.

SUMMARY

The present invention duplicates to a considerable degree the hand process in that the carcass with the legs and thighs attached to the back are pendulously supported by their feet from shackles that are in turn suspended at spaced intervals along an overhead conveyor. Each carcass is suspended to have the legs and thighs aligned along the direction of movement of the overhead conveyor with the back flipped over to lie between the legs in a reverse direction from the normal position. A dismembering conveyor having retaining bars supported above it to closely overlie the length of the conveyor is mounted below the shackles with the dismembering conveyor and overlying retaining bars aligned that their longitudinal axes diverge both horizontally and vertically at an acute angle from the path of the overhead conveyor from which the shackles are suspended. The dismembering conveyor is an endless conveyor having upper and lower reaches in which the upper reach moves from entrance to exit ends in the direction of movement of the overhead conveyor. The dismembering conveyor and the ends of the overlying restraining bars at the entrance end are positioned such that the leg thigh portions immediately adjacent the back of carcasses suspended by the shackles become engaged between the retaining bars with the carcass backs extending transversely of the retaining bars and trapped between the retaining bars and the upper reach of the dismembering conveyor as the carcasses are carried by the shackles toward the entrance end of the dismembering conveyor. The backs that are retained between the retaining bars and the upper reach of the dismembering conveyor are forced to follow a path between the retaining bars and the dismembering conveyor and the upper thigh portions immediately adjacent the backs, which are wedged between the retaining bars, follow the horizontal path of motion of the dismembering conveyor as the carcass legs are carried by the shackles along a diverging path suspended below the overhead conveyor. The horizontal relationship between the retaining bars preferably changes from the entrance to the exit ends, e.g., one bar being closer to the dismembering conveyor than the other bar at the entrance end and the one bar being farther from the dismembering conveyor than the other bar at the exit end so as to cause the back to be rotated in its lengthwise dimension with respect to the legs and thighs as it is carried along the length of the dismembering conveyor. The path followed by the legs supported from the shackles that diverges from the path of the dismembering conveyor and retaining bars, that are in engagement with the backs and the thigh portions immediately adjacent the backs along with the tilting motion of the backs created by the difference in horizontal alignment of the retaining bars, parts the legs and thighs from the backs that are retained between the dismembering conveyor and the retaining bars.

An object of this invention is to provide an apparatus for separating the legs and thighs from the backs of poultry carcasses.

A further object of the invention is to provide an apparatus which will separate the thighs of poultry from the back in a manner to substantially remove all thigh meat from the back.

DRAWINGS

A preferred embodiment of the invention can best be understood by reference to the following description taken in connection with the accompanying drawings in which:

FIG. 2 is a plan view taken along section line 2—2 of FIG. 1.

FIG. 3 is a sectional side elevation taken along section line 3—3 of FIG. 2.

FIG. 4 is an end elevation taken along section line 4—4 of FIG. 1.

FIG. 5 is a sectional end elevation taken along section line 5—5 of FIG. 1.

DESCRIPTION OF A PREFERRED EMBODIMENT

Figure 1:
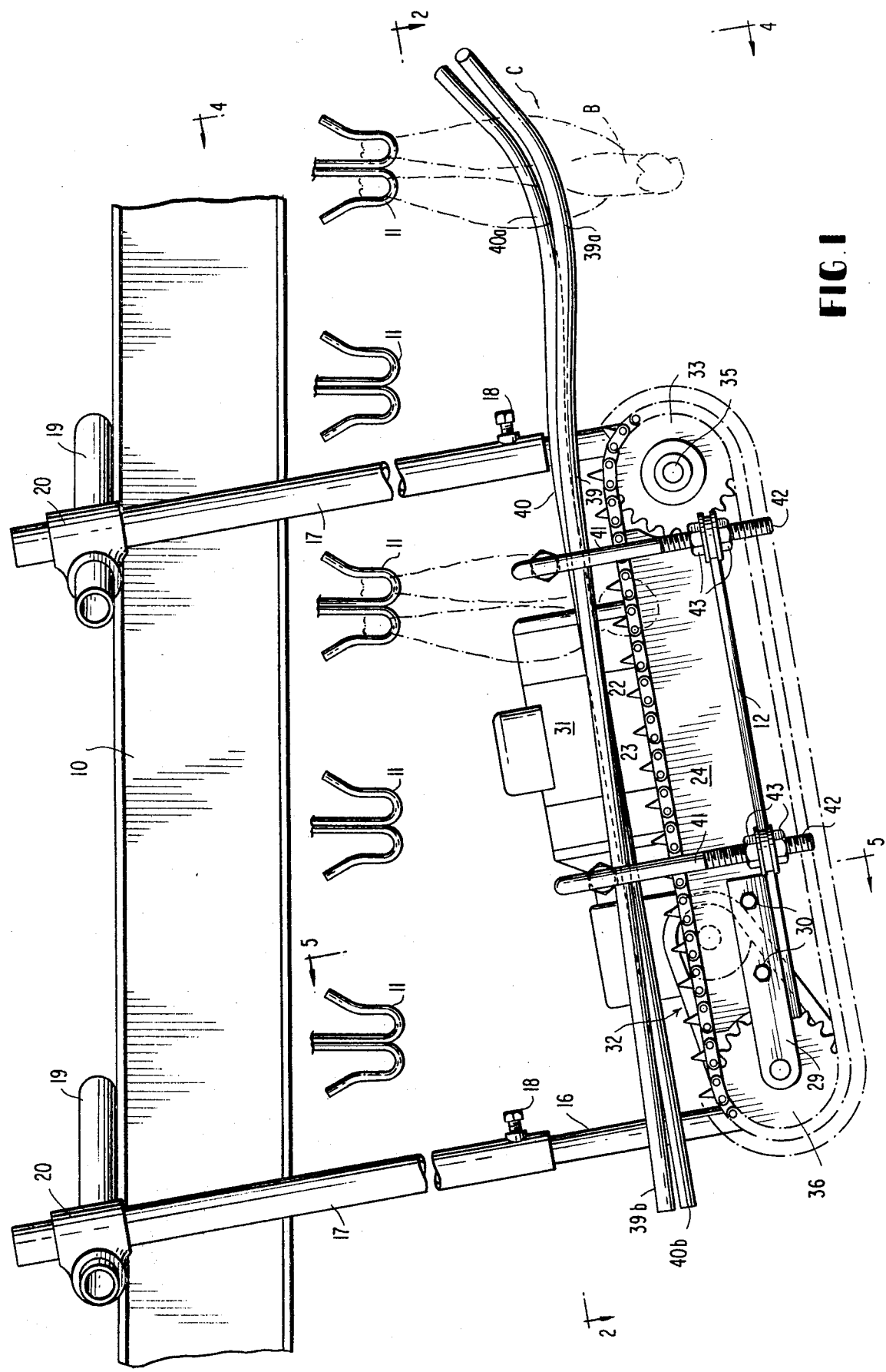
FIG. 1 is a side elevation of the apparatus.

Modern poultry processing plants utilize a system of overhead conveyors for transporting the poultry through the various operations in processing the poultry. The typical conveyor comprises an overhead chain type conveyor supported from a beam with the elongated shackles having their upper ends pivotally connected at intervals along the length of the chain conveyor suspended below the overhead conveyor. The lower ends of the shackles are configured to engage the lower end of the legs or feet of poultry which are pendulously supported by the shackles in a freely hanging position below the overhead conveyor as it moves along its processing path. The shackles 11 only of the conveyor are illustrated in FIGS. 1, 4 and 5 and the overhead conveyor beam 10 in FIG. 1 supports the moving elements of the endless overhead conveyor with its chain links and other elements (not illustrated) that support the shackles 11 in which the lower joint of the legs and thighs are engaged in pendulously supporting the carcass C as it is carried along the line of the overhead conveyor by the shackles 11. A platform 12 has upwardly extending support ears 13 at each end which are each connected by a bolt 14 to an auxiliary supporting member 15 having a protruding upper end 16 that is slidably retained within the interior of a vertically extending stanchion 17 by a set screw 18. A pair of horizontally extending stanchions 19 welded to the beam 10 are adjustably attached to the vertical stanchions 19 by means of cross pipe fittings 20 that have set screws (not illustrated) by means of which horizontal and vertical adjustments may be made to the positions of the stanchions 17 and 19. The alignment and position of the platform 12 may be adjusted relative to the beam 10 by means of the auxiliary supporting member set screws 18 and the cross pipe fittings 20 and its set screws.

An endless conveyor 21 having a pair of side by side endless chains 22 containing outwardly extending teeth 23 is supported by a pair of spaced-apart flanges 24, 25 extending upwardly from the platform 12 near one side of the platform. The upper reaches of the endless chains 22 ride along the upper edges of the two flanges 24, 25 with one of the end portions of the endless path of the chains 22 drivingly engaged in the teeth of a pair of sprocket wheels 26 and hubs 27 that are keyed to a drive shaft 28 supported by bushing blocks 29 that are affixed to the pair of upstanding flanges 24 and 25 by bolts 30, the drive shaft 28 being driven by the motor 31 through a chain and sprocket drive assembly 32 interconnecting the motor and drive shaft 28. The other end portions of the endless path of the chains 22 are in engagement with the teeth of a pair of sprocket wheels 33 with hubs 34 and bushings that are rotatably mounted on an axle 35 that is supported by a bar 36 slidably contained within an open ended housing 37 extending between the platform flanges 24, 25, the position of the bar 36 within the housing 37 being maintained by the adjusting screw 38 to maintain the conveyor chains 22 in tension. The motor 31 drives the endless chains 22 of the dismembering conveyor 21 at approximately the same speed as the shackles 11 are carried by the overhead conveyor with the direction of movement of the upper reach of the conveyor chains 22 being in the same direction of travel as the shackles are carried by the overhead conveyor.

A pair of elongated back retaining bars 39, 40 are adjustably supported by the platform in a position to extend lengthwise of and spaced closely above the teeth 23 of the upper reaches of the endless conveyors 21. A pair of curved outer supports 41, each have one end welded to the outer retaining bar 39 at spaced intervals along the central section of the outer retaining bar, and the other threaded lower ends 43 of the curved outer supports 41 are retained by nuts 43 in slots 44 extending in a direction perpendicular to the outer retaining bar 39 in platform extensions 45. At spaced intervals along the central section of the inner retaining bar 40, one end of inner supports 46 are welded onto the inner retaining bar and outer threaded ends 46a of the inner supports are affixed by nuts 47 to the tops of vertical supports 48 of which the lower threaded ends 48a are secured by nuts 49 to platform 12. By adjusting the threaded portions of the retaining bar supports in the securing nuts, the inner and outer retaining bars 39 and 40 and their respective end portions can be adjusted with respect to the platform and the upper reach of the dismembering conveyor 21. Outer end portions 39a and 40a of the retaining bars 39, 40 are positioned in a manner to provide an entering throat for engaging and guiding the poultry carcass C into a channel 50 defined by the central segments of the retaining bars 39, 40 as they extend in an overlying relationship above each of the dismembering conveyor chains 22.

Poultry of approximately the same age and size are normally processed at the same time since the apparatus must be adjusted to conform to the dimensions and configurations of the poultry being processed. The position of the platform 12, with the retaining bars 39, 40 and dismembering conveyor 21 mounted on it, is adjusted by means of the aforedescribed mounting means such that the converging throat between the retaining bar end portions 39a and 40a and vertically below the shackles 11 as they are carried along the conveyor path in the manner illustrated in FIG. 2. The height of the upper end of the platform at the upstream, entrance end of the dismembering conveyor 21 is positioned at a vertical height by the aforedescribed set screws and adjustments such that the back B of each carcass C, that is carried by the overhead conveyor shackle 11 into the converging throat between the entrance ends 39a and 40a of the retaining bars with the back B extending transversely of the retaining bars and perpendicular to them, enters the space between and in contact with the lower surfaces of the retaining bars 39, 40 and the teeth 23 and chains 22 of the upper reach of the dismembering conveyor 21. The rear end of the platform at the exit end of the dismembering conveyor 21 is positioned by the aforedescribed platform adjusting means such that the axis of the dismembering conveyor 21 diverges at an acute angle vertically downwardly from the horizontal path of the overhead conveyor and shackles 11, as shown in FIG. 1, and the axis of the dismembering conveyor 21 diverges horizontally at an acute angle from the horizontal path of the conveyor and shackles 11, as illustrated in FIG. 2. The retaining bars 39, 40 are adjusted by the aforedescribed support adjusting means such that the central and end sections of each of the retaining bars lies vertically above to extend axially along the length of the upper reach chain 22 of the dismembering conveyor 21 with the height of each of the retaining bars at the entrance ends 39a, 40a and exit ends 39b and 40b above the dismembering conveyor 21 varying in the manner illustrated in FIG. 1. In the configuration illustrated in FIG. 1 the height of the entrance end 39a of the outer retaining bar 39 is closer to the upper reach of the conveyor chain 22 than the entrance end 40a of the inner retaining bar 40 and the exit end 40b of the inner retaining bar 40 is closer to the upper reach chain 22 of the conveyor than the exit end 39b of the outer retaining bar 39. This results in the back, retainingly engaged between the retaining bars 39, 40 and the upper reach chain 22 of the conveyor 21, being pivoted lengthwise between the legs as the back is carried by the conveyor teeth 23 along the length of the conveyor beneath the retaining bars 39, 40 with the upper extremities of the thighs immediately adjacent the back engaged between the retaining bars in the space 50 as the lower portion of the carcass legs are carried by the shackles 11 along a path which diverges vertically and horizontally from the path of the back and upper thigh portions that follow the path of the dismembering conveyor 21. Through this twisting and diverging motion created between the legs supported by the shackles suspended from the overhead conveyor with the backs retained in the space between the retaining bars 39, 40 in the upper reach of the conveyor 21, the extremities of the thighs immediately adjacent the carcass back are lifted and cleanly parted from the back. Although the above described variation in the alignment of the height of the retaining bars has been found suitable for cleanly removing the legs and thighs from a typical back carcass, the alignment and positions of the retaining bars and the dismembering conveyor can be modified by the aforedescribed means for adjusting the position of the platform and the relative positions of the retaining bars on the platform from that described in accommodating poultry of different sizes than the ones processed on the described embodiment.

Whereas a particular embodiment of the present invention has been illustrated and described above, modifications and alternative structures to the disclosed embodiment may be utilized without departing from the spirit and scope of the invention as defined by the appended claims.

I claim:

1. Poultry dismembering apparatus for disjointing and removing the leg and thigh portions from the backs of poultry leg and back carcasses pendulously supported by the legs from shackles suspended at spaced intervals from an overhead conveyor movable along a predetermined path, said apparatus comprising an elongated dismembering conveyor mounted below the level of said shackles for movement along a path diverging both horizontally and vertically at acute angles from said overhead conveyor path, said dismembering conveyor being adapted to engage one side of the carcass back and carry said backs along the dismembering conveyor path of movement and including means for moving said dismembering conveyor with engaged carcasses along said dismembering conveyor path of movement between entrance and exit ends of said dismembering conveyor in the same direction as said overhead conveyor path, and means supported in alignment with and spaced closely above said dismembering conveyor below said shackles adapted to contact the carcasses adjacent the juncture of the carcass leg thighs and the side of said carcass back opposite said one side contacted by said dismembering conveyor for retaining said backs in engagement between said dismembering conveyor and overlying retaining means and causing the engaged thigh portions immediately adjacent the backs to follow the horizontal line of motion of said dismembering conveyor as the carcass legs are carried by the shackles along a diverging path suspended below the overhead conveyor, thereby parting the legs and thighs from the backs retained between said dismembering conveyor and retaining means.

2. The apparatus of claim 1 wherein said retaining means comprises a pair of elongated bars spaced apart in juxtaposition to closely overlie and extend axially of said dismembering conveyor with the opening between an entrance end of said bars upstream of said dismembering conveyor entrance end vertically below said overhead conveyor path and the spacing between the portions of said bars overlying said dismembering conveyor being such as to contain and permit passage of each of the poultry carcass thighs adjacent the back portion between said bars with the back in engagement below said bars.

3. The apparatus of claim 2 wherein said bars are adjustably positionable to establish the entrance end portion of one of said bars closer to said dismembering conveyor than the corresponding end portion of the other bar and the exit end portion of said one bar opposite said entrance end is farther from said dismembering conveyor than the corresponding end portion of the other bar, whereby the angular position between the back and legs changes as the carcass moves along the length of the dismembering conveyor.

4. The apparatus of claim 3 wherein said bars are adjustably positionable such that a substantial portion of said bars are spaced apart substantially equally and the entrance end portions of said bars extending upstream from said dismembering conveyor are curved to form a converging entry throat vertically below the path of said overhead conveyor.

5. The apparatus of claim 1 wherein said dismembering conveyor is an endless conveyor having outwardly extending tooth conveyor elements movable along an upper reach in the same direction as said overhead conveyor and returning along a lower reach in the opposite direction.

6. The apparatus of claim 2 wherein said dismembering conveyor is an endless conveyor having a row of outwardly extending tooth conveyor elements movable along an upper reach below each said restraining bar in the same direction as said overhead conveyor and returning along a lower reach in an opposite direction.

7. Poultry dismembering apparatus for disjointing and removing the leg and thigh portions from the backs of poultry leg and back carcasses pendulously supported by the legs from shackles suspended at spaced intervals from an overhead conveyor movable along a predetermined path with the legs of each carcass aligned in the direction of the overhead conveyor movement and the backs positioned between the legs in a reverse direction from a normal position, said apparatus comprising a platform, a dismembering conveyor having conveying elements movable along upper and lower reaches of an endless path and adapted to engage one side of a poultry carcass back, means mounting said dismembering conveyor on said platform with said conveying element reaches extending a lengthwise dimension of said platform, means operably connected to said dismembering conveyor for moving said conveying elements around said endless path with the upper reach moving between entrance and exit ends in the same direction as said overhead conveyor, a pair of elongated retaining bars, means for adjustably supporting said retaining bars on said platform in a juxtaposed, spaced apart relationship to extend along the length of and closely above said dismembering conveyor upper reach with end portions of said bars extending beyond said upper reach entrance end, adjustable platform support means connecting to said platform for supporting the platform in a position such that the path of said dismembering conveyor is at a lower level than said shackles and diverges both horizontally and vertically at an acute angle from said overhead conveyor along which the shackles are moved and the opening between said bar end portions is vertically below said overhead conveyor path, said retaining bar supporting means includes means for adjusting the spacing between said bars and the distance between said bars and said dismembering conveyor upper reach such that both sides of said carcass backs are retained between and in engagement with said bars and dismembering conveyor upper reach as the carcass legs are carried by the shackles along the diverging path of said overhead conveyor and become parted from the backs retained between the dismembering conveyor upper reach and said overlying retaining bars.

8. The apparatus of claim 7 wherein said dismembering conveyor conveying elements include two continuous rows of outwardly extending teeth spaced apart along each of said rows movable along said upper and lower reaches around an endless path with the upper reach of each said row spaced vertically closely below and substantially parallel to a different one of said retaining bars.

* * * * *